US009740918B1

(12) United States Patent
Balasubramanian et al.

(10) Patent No.: US 9,740,918 B1
(45) Date of Patent: *Aug. 22, 2017

(54) DETECTING OBJECTS IN MULTIPLE IMAGES USING INTEGRAL IMAGES

(71) Applicant: Amazon Technologies, Inc., Seattle, WA (US)

(72) Inventors: Venkatesh Balasubramanian, San Jose, CA (US); Vaughn Todd Arnold, Scotts Valley, CA (US)

(73) Assignee: Amazon Technologies, Inc., Seattle, WA (US)

(*) Notice: Subject to any disclaimer, the term of this patent is extended or adjusted under 35 U.S.C. 154(b) by 37 days.

This patent is subject to a terminal disclaimer.

(21) Appl. No.: 14/717,910

(22) Filed: May 20, 2015

(51) Int. Cl.
*G06K 9/00* (2006.01)
(52) U.S. Cl.
CPC ................ *G06K 9/00288* (2013.01)
(58) Field of Classification Search
CPC .... G06K 9/6202; G06K 9/00288; G06K 9/46; G06K 9/4604; G06K 9/6212; G06K 9/00295; G06K 9/6267; G06K 9/00221; G06K 9/00362; G06T 2207/30201
See application file for complete search history.

(56) References Cited

U.S. PATENT DOCUMENTS

| | | | | |
|---|---|---|---|---|
| 5,809,171 A * | 9/1998 | Neff | ................... | G06K 9/00973 382/103 |
| 9,342,894 B1 * | 5/2016 | Gopalakrishnan | .... | G06T 7/0081 |
| 2001/0031129 A1 * | 10/2001 | Tajima | ................... | H04N 5/782 386/241 |
| 2002/0009144 A1 * | 1/2002 | Ishihara | ................ | G06T 7/2013 375/240.16 |
| 2002/0009229 A1 * | 1/2002 | Fu | ............................ | G06K 9/46 382/199 |
| 2004/0146194 A1 * | 7/2004 | Ichikawa | .............. | G06T 7/0006 382/145 |
| 2006/0000968 A1 * | 1/2006 | Katayama | .......... | G01N 21/9054 250/223 B |
| 2006/0062435 A1 * | 3/2006 | Yonaha | ................... | G06T 11/60 382/118 |
| 2007/0122008 A1 * | 5/2007 | Perlin | ................ | G06K 9/00248 382/118 |

(Continued)

OTHER PUBLICATIONS

Office action for U.S Appl. No. 14/717,933, mailed on Jan. 19, 2017, Balasubramanian et al., "Detecting Objects in Multiple Images Using Integral Images", 15 pages.

*Primary Examiner* — Jingge Wu
(74) *Attorney, Agent, or Firm* — Lee & Hayes, PLLC

(57) ABSTRACT

Subject matter disclosed herein relates to arrangements and techniques that provide for identifying objects within an image such as the face position of a user of a portable electronic device. An application specific integrated circuit (ASIC) is configured to locate objects within images. The ASIC includes an image node configured to process an image and a search node configured to search the image for an object in the image. The ASIC also includes an ensemble node configured to confirm the presence of the object in the image. The ensemble node progressively compares, using computational engines that include accumulators, the pixel values of a template with pixel values of a region of interest in the image to create comparison result values.

18 Claims, 15 Drawing Sheets

(56) References Cited

U.S. PATENT DOCUMENTS

| | | | | |
|---|---|---|---|---|
| 2010/0165093 | A1* | 7/2010 | Sugio | A61B 3/113 348/78 |
| 2011/0273571 | A1* | 11/2011 | Shimada | G06K 9/00261 348/207.99 |
| 2012/0020568 | A1* | 1/2012 | Kogane | G06K 9/00221 382/195 |
| 2012/0327172 | A1* | 12/2012 | El-Saban | G06K 9/00228 348/14.02 |
| 2015/0062652 | A1* | 3/2015 | Kawai | G06K 15/1868 358/1.18 |
| 2015/0078629 | A1* | 3/2015 | Gottemukkula | G06K 9/0061 382/117 |
| 2015/0302239 | A1* | 10/2015 | Ohba | G06K 9/00261 382/154 |

* cited by examiner

| | Col 33 | Col 32 | ... | Col 1 | Col 0 | |
|---|---|---|---|---|---|---|
| Cycle 0 | Acc=0 | Acc=0 | ⋮ | Acc=0 | Acc=0, shiftI[0] | |
| Cycle 1 | Acc=0 | Acc=0 | ⋮ | Acc=0, shift I[0] | Acc=0, shift I[1] | Image pixel shifts in |
| ⋮ | ⋮ | ⋮ | ⋮ | ⋮ | ⋮ | |
| Cycle 33 | Acc+=(I[0]-T[0])² | Acc+=(I[1]-T[0])² | ⋮ | Acc+=(I[48]-T[0])² | Acc+=(I[49]-T[0])² | Templ pixel to all cols. |
| Cycle 34 | Acc+=(I[1]-T[1])² | Acc+=(I[2]-T[1])² | ⋮ | Acc+=(I[49]-T[1])² | Acc+=(I[50]-T[1])² | Shift pixels omitted |
| ⋮ | ⋮ | ⋮ | ⋮ | ⋮ | ⋮ | for clarity |
| Cycle 67 | Acc+=(I[33]-T[33])² | Acc+=(I[34]-T[33])² | ⋮ | Acc+=(I[66]-T[33])² | Acc+=(I[67]-T[33])² | |

DETECTING OBJECTS IN MULTIPLE IMAGES USING INTEGRAL IMAGES

BACKGROUND

Many portable or stationary electronic devices are becoming more complex and using various technologies for controlling the portable electronic devices as well as for providing various user functionality and interactions. The implementation of these complex technologies and the processing associated therewith can require a large amount of resources from the portable electronic device's application processor and/or central processing unit (CPU). Such processing requirements can result in slower performance by the portable electronic device, greater power requirements, and/or the need for larger and more powerful processors for the portable electronic device.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIG. 9C is a table illustrating the data pipeline of the flow of data in FIG. 9B, in accordance with various embodiments.

DETAILED DESCRIPTION

Figure 1:
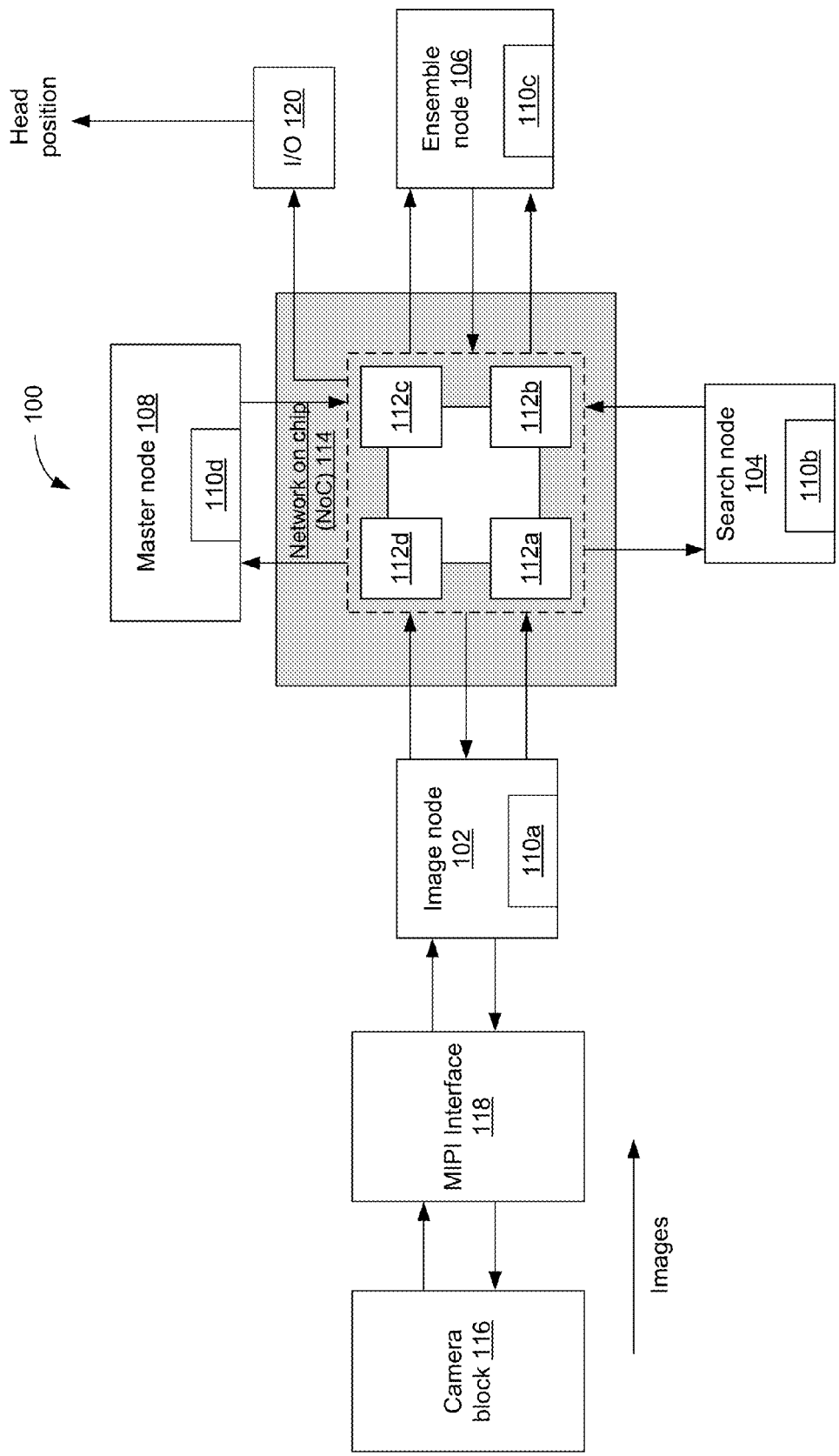
FIG. 1 schematically illustrates an Application Specific Integrated Circuit (ASIC), in accordance with various embodiments.

The present application provides arrangements and techniques for identifying objects within an image such as the face position of a user of a portable electronic device. More particularly, the present disclosure provides an Application Specific Integrated Circuit (ASIC) that identifies the position of a user's face, verifies a position of the user's face and then provides the position of the user's face to the application processor (AP) of the portable electronic device for use by the AP.

A portable electronic device such as, for example, a smartphone, a tablet computing device, a notebook computing device, etc., generally displays content on a display. The content can include, for example, images, words, etc. Such content can be displayed to a user for viewing. When the user is ready to move on to further content, the user can "scroll" the content on the display to new content. Often, the user scrolls the content on the display via, for example, by contacting the display (e.g., a touchscreen display), or physical inputs such as a keyboard, a toggle switch, a mouse pad type device, etc. However, technology has now been developed and used to allow for the portable electronic device to recognize an image of a portion of the user and track that portion of the user for movement that can be used by the portable electronic device to signify a desire to scroll content displayed on the display of the portable electronic device. For example, an image of the position of a user's face can be tracked by cameras on the portable electronic device to thereby signify desired movement of scrolling of the content on the display. For example, the cameras may track the user's face to determine that the user's face is moving in an upward motion, thereby indicating that the user wishes the content on the display to scroll upward to provide further content on the display. Likewise, the cameras can track movement of the user's face in a downward or side-to-side movement to indicate a desire for the user to have content scrolled in a downward motion on the display or in a side-to-side motion. However, such processing requires a great deal of power and time on the part of the application processor for the portable electronic device.

In accordance with various embodiments, the NoC included with a portable electronic device includes three nodes for processing and identifying images corresponding to a position of a user's face. The NoC includes an image node that receives images from four corner cameras. The four corner cameras are generally located in the four corners of a display of the portable electronic device. In accordance with various embodiments, only two of the four images are utilized by the image node since often, one or two of the cameras are occluded by the user's fingers. Furthermore, as will become apparent herein, only two images are generally needed for identifying a position of the user's face. The other two images, and thus a total of four images, can be utilized to calibrate the four corner cameras of the portable electronic device. The image node processes the two images so that the two images can be searched for a user's face. The processing can include exposure correction in the form of a black level correction, defective pixel correction, and a statistical analysis of the images.

Once the image node has processed the two images, generally a left image and a right image, the two images are forwarded to a search node. The search node generally scales the image down such that a minimum size of an object of interest, such as the user's face, can fit within a search window. The search node then searches for the user's face within a first image. Once the search node determines that it has found the user's face within a region of interest, the search node searches the second image in order to determine if the face can be found in a similar region of interest within the second image.

The search node will progressively search within the first image and will continue to scale the first image down such that a maximum size of the item of interest, such as the user's face, will fit within a search window. In accordance with various embodiments, the search node includes a cascade classifier that contains stages of Haar features that are trained to identify a particular object or pattern. The searching of the various regions within the images progresses through the various stages of the cascade classifier until either a stage fails, or a region of interest in the image passes all of the stages, thereby indicating the presence of an object such as the user's face. The downsizing and searching of the image continues until a location of the object within the image can be determined.

Once the search node has identified the presence of a face in both the right and left images, the image is sent to an ensemble node of the ASIC. The ensemble node is utilized to confirm the presence and size of the face in a region of interest in the first image and a corresponding region of interest in the second image. In accordance with various embodiments, a template is utilized by the ensemble node to compare, pixel-by-pixel, the region of interest in the first image and, pixel-by-pixel, the region of interest in the second image. If the ensemble node confirms the presence and size of a face in the two images, then the image of the face is sent back to the search node to extract facial features from the face. The features from the face are then forwarded to the application processor which will then analyze the features of the face to determine positions of the face in order to control the scrolling.

However, quality of input images can change due to different lighting conditions and other factors. Thus, a simple difference computation may not find an accurate match. This can be solved by performing multiple match loops each with a scaled image to determine a match. Such an approach may consume more power. Thus, the ensemble node of the ASIC includes hardware support to normalize the template as well as the input images. This enables the ASIC to perform the match in a single iteration and thereby saves power.

Additionally, an approach to performing template matching could require the input image data to be shifted through a datapath. However, such an approach generally results in a lot of dynamic power consumption. Thus, the ensemble node uses an array of accumulators to perform partial summation of the image differences with each pixel being presented to all the compute elements of a row (rather than shifting the pixels through). This approach requires shifting the accumulator results through the array. However, since accumulators generally toggle each cycle regardless of whether they are being shifted, the shifting of the accumulators generally does not increase dynamic power consumption.

FIG. 1 schematically illustrates an Application Specific Integrated Circuit (ASIC) 100 that includes four nodes 102, 104, 106 and 108. The four nodes 102, 104, 106 and 108 include an image node 102, a search node 104, an ensemble node 106 and a master node 108. The ASIC 100 includes four scaler Microprocessor without Interlocked Pipeline Stages (MIPS) cores 110*a, b, c* and *d* and four megabytes of internal memory 112*a, b, c* and *d*. In accordance with various embodiments, the internal memory 112 is static random access memory (SRAM). More or less memory may be included if desired. As can be seen, the four processor cores 110*a, b, c* and *d* are associated with one of the nodes 102, 104, 106 and 108, respectively.

The ASIC 100 further includes a Network-On-Chip (NoC) 114 that couples the nodes 102, 104, 106 and 108 together for sending and receiving messages among the nodes 102, 104, 106 and 108. As is known, a NoC is an emerging option for communications within large very large scale integration (VLSI) systems implemented on a single silicon chip. In a NoC system, modules such as processing cores, memories and specialized internet protocol (IP) blocks exchange data, instructions, etc. using a network as a "public transportation" sub-system for the information traffic. A NoC is generally constructed from multiple point-to-point data links interconnected by switches (also referred to as routers), such that messages can be relayed from any source module to any destination module over several links by making routing decisions at the switches. A NoC is similar to a modern telecommunications network, using digital bit-packet switching over multiplexed links. Although packet-switching is sometimes claimed as a necessity for a NoC, there are several NoC proposals utilizing circuit-switching techniques. The definition of a NoC based on routers is usually interpreted such that a single shared bus, a single crossbar switch or a point-to-point network are generally not NoCs but practically all other topologies are considered NoCs.

The master node 108, serves as "the command and control block" for the ASIC 100. The master node 108 is responsible for boot and power management, as well as controlling the three other MIPS processor cores 110*a, b* and *c* in the ASIC 100.

As can be seen, the image node 102 is in communication with the four corner cameras, represented by a camera block 116 via a Mobile Industry Processor Interface (MIPI) interface 118. A low speed input output (I/O) 120 is in communication with an application processor (not illustrated) of a portable electronic device (not illustrated) that includes the ASIC 100.

Figure 2:
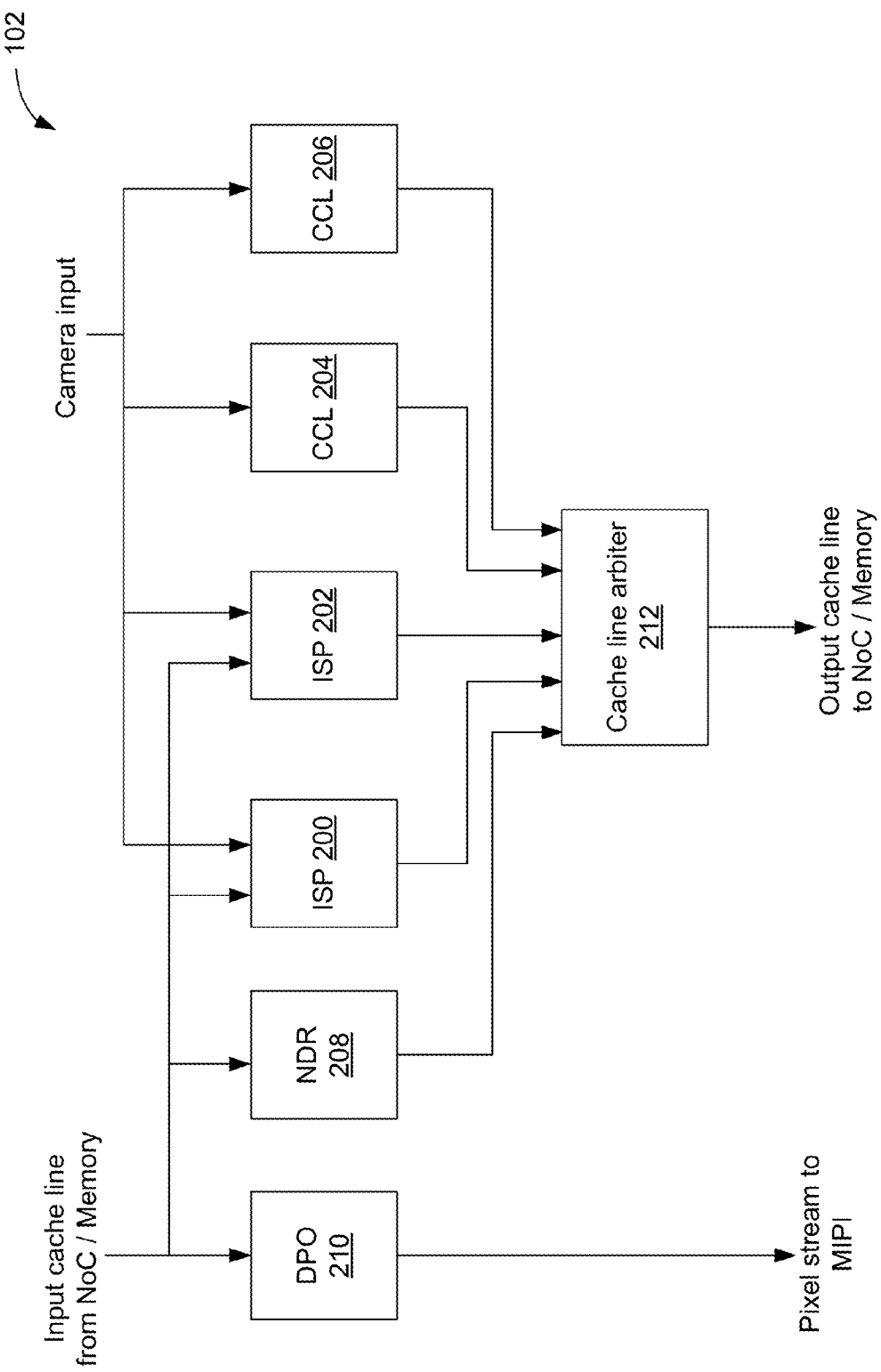
FIG. 2 schematically illustrates an image node of the ASIC of FIG. 1, in accordance with various embodiments.

FIG. 2 schematically illustrates the image node 102. The image node 102 includes two image sensor processors (ISP) 200, 202 and two camera calibration logic (CCL) 204, 206. The ISPs 200, 202 and the CCLs 204, 206 are in communication with the MIPI interface 116 that is in communication with the four corner cameras (camera block 114). The image node 102 also includes a 90 degree rotate (NDR) 208, and a debug port output (DPO) 210. The CCLs 204, 206 and the DPO 210 are utilized for calibration of the four corner cameras (in conjunction with the ISPs 200, 202). The calibration of the four corner cameras is performed by the AP and will not be discussed further herein. However, the calibration of the four corner cameras is important so that a relative position of a region of interest (ROI) in one camera translates to a maximally bounded corresponding ROI in another camera based on estimated z-depth. Specifically, the uncertainty in the size and position of the ROI in the second camera should be a function primarily of the uncertainty in the z-depth estimation and not the uncertainty of the two cameras in global coordinate space. The image node 102 also includes buffers (not illustrated). The image node 102 also includes a cache line arbiter 212.

The NDR 208 is utilized since often the user may be using the portable electronic device in a "landscape" mode. In such an instance, images arriving from the cameras may actually be on their sides. Thus, the NDR 208 can be utilized to rotate the images based upon an indication that the portable electronic device is being operated in a landscape mode. In accordance with various embodiments, the NDR 208 is configured to rotate the images 90 degrees, 180 degrees and 270 degrees.

Each ISP 200, 202 provides functionality that includes static and dynamic defective pixel detection and correction, black-level correction and gain control, and full and partial image statistical generation and analysis. Generally, the primary processing is to the camera exposure control. These are latency critical adjustments, so dedicated hardware is included to statistically analyze the full input images over one of several specified regions of interest (ROI) in the image. Camera adjustments can be based on the entire image or can be made to track ROIs corresponding to tracking or potential face positions. Local black level correction also facilities search retrying of images corrected based on different regions (if new images are not available yet due to low frame rate). The image statistical generation and analysis can be used for normalization of matching thresholds.

Generally, the ISPs 200, 202 receive a signal that a frame is coming in and then moves the frame through the ISPs 200, 202 to process the images. The processed images can then be written to memory 112a or can be provided to another node within the ASIC 100.

Figure 3:
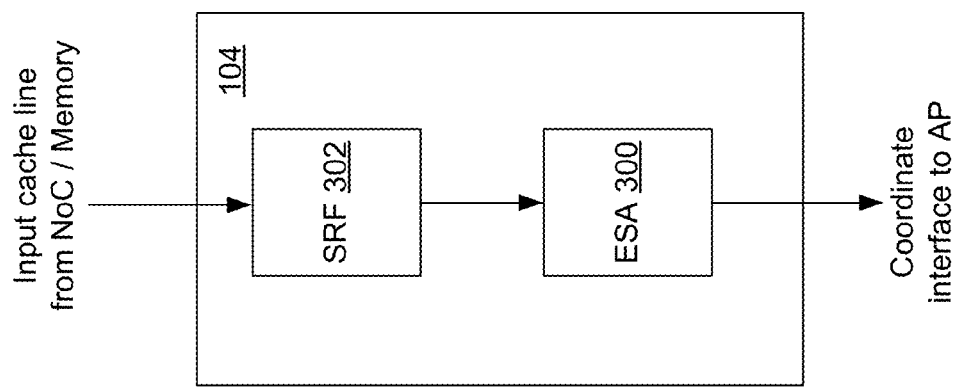
FIG. 3 schematically illustrates a search node of the ASIC of FIG. 1, in accordance with various embodiments.

FIG. 3 schematically illustrates the search node 104. The search node 104 includes an exhaustive search array unit (ESA) 300 and a scaling resample filter (SRF) 302. The ESA 300 and the SRF 302 are controlled by the MIPS core 110b.

The SRF 302 is designed to resample an image while downsizing it. In accordance with various embodiments, the SRF 302 is a six tap programmable scaler. The coefficients are programmable, so various types of filters can be implemented. In accordance with various embodiments, Lanczos resampling coefficients are used and the maximum downscale is approximately one-sixth.

Once the image is scaled down, the image is ready to be searched for objects. Search processing by the ESA 300 largely involves passing a search window over the image until the entire scaled image has been searched. An individual window is searched by applying and testing each stage of a cascade classifier until a stage fails or all stages are passed. If all stages pass, then an object is determined to have been found in the image and its coordinates and dimensions are saved. Generally, the process is then repeated for a second image related to the first image, i.e. the stereo image of the first image, to check if the object is also located at the same coordinates and with the same dimensions in the second image. Searching of the second image can also be done simultaneously with searching the first image if desired.

More particularly, it is possible to search a full size image, which in accordance with various embodiments, is approximately 400×400 pixels. However, the search window, in accordance with various embodiments, is generally 32×32 pixels. Other image sizes and search windows may be sued if desired. Since a minimum size for an object, e.g., the user's face, may be, for example, 50×50, the image generally needs to be scaled down until the minimum size of the object fits within the 32×32 search window. Thus, the original 400×400 image is generally scaled down to 256×256. The entire image is searched by passing the search window over the scaled down image, generally beginning at location 0, 0 of the image. The scaled image is generally saved and if the initial searching passes the stages, then the image is further scaled down and searched until the image has been scaled down to a point that the maximum object size, e.g., 220×220 for a user's face, fits within a 32×32 search window. The image is scaled by a programmable factor with a default of 1.2 each iteration.

The search implementation utilizes Haar Evaluator type features based upon the Viola-Jones algorithm. The Haar features are combinations of 2 or 3 rectangular shapes. These shapes can be compared and tested against a threshold, and this yields useful information regarding the presence of a face or facial features in the current search window. Generally the Haar features and the Viola-Jones algorithm are very efficient at indicating when an object is not present within an image. The rectangular shapes of the Haar features are computed by adding up pixel values of all of the pixels in the given rectangle. This can generally be accomplished very quickly for any arbitrarily sized rectangle if an "integral image" of a given input image is computed ahead of time.

Figure 4:
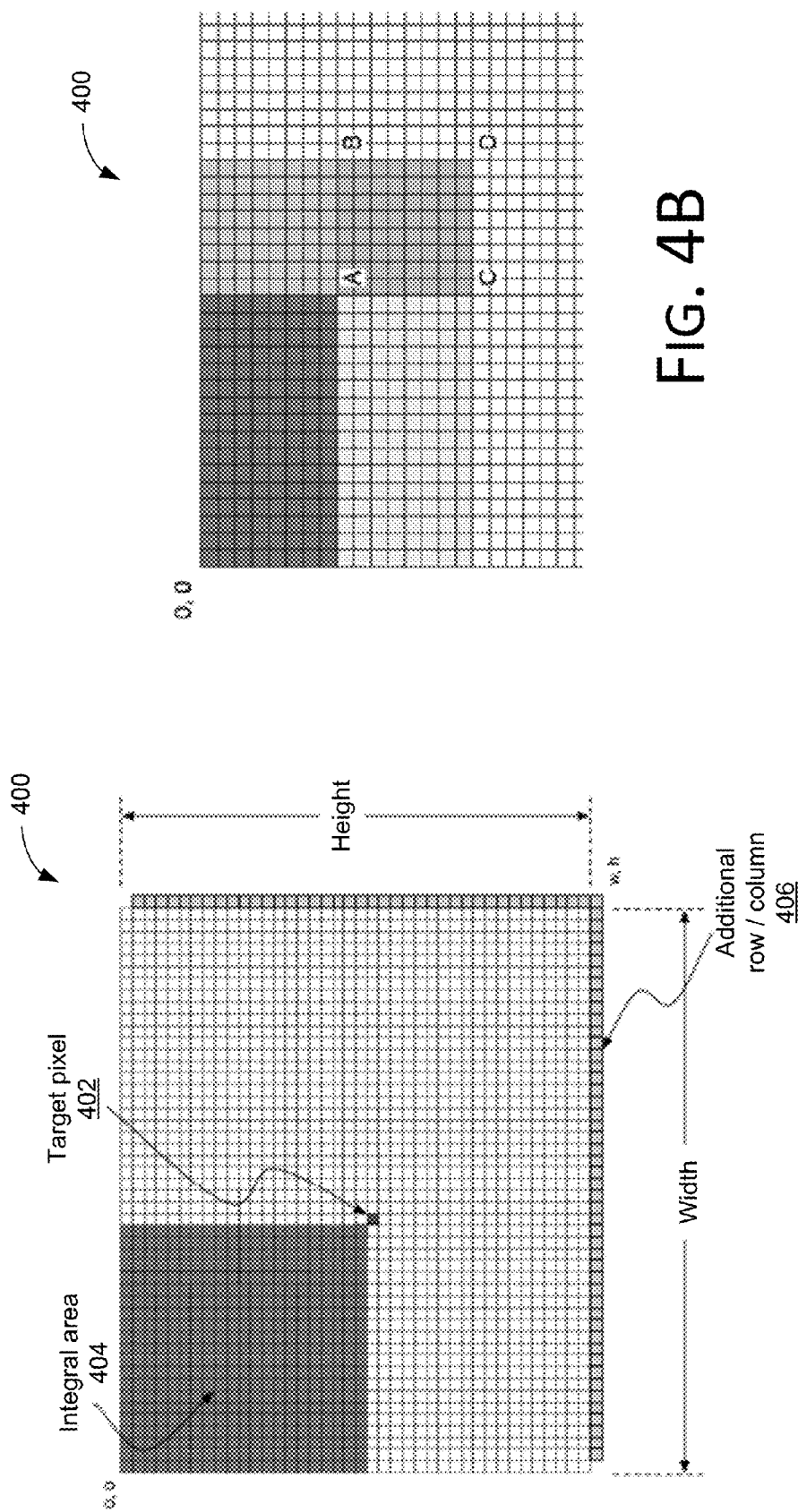
FIGS. 4A and 4B schematically illustrate integral images for pixels of an image.

In order to create an integral image, each pixel is assigned a value e.g. an integral image pixel value, that is equivalent to the sum of all the pixels to the upper left of the location of the pixel. More particularly, the integral image is a version of the input image where each pixel is replaced by the value of all of the pixels to the left and above the given pixel location in the input image. Thus, as can be seen in FIG. 4A, a target pixel 402 of an image 400 is assigned a value equal to all of the pixels in the integral area 404. Note that the integral image is one pixel wider and higher than the input image (additional row/column 406). Further note that the pixel at location [w, h] contains the total of all of the pixels in the entire image 400.

Figure 5:
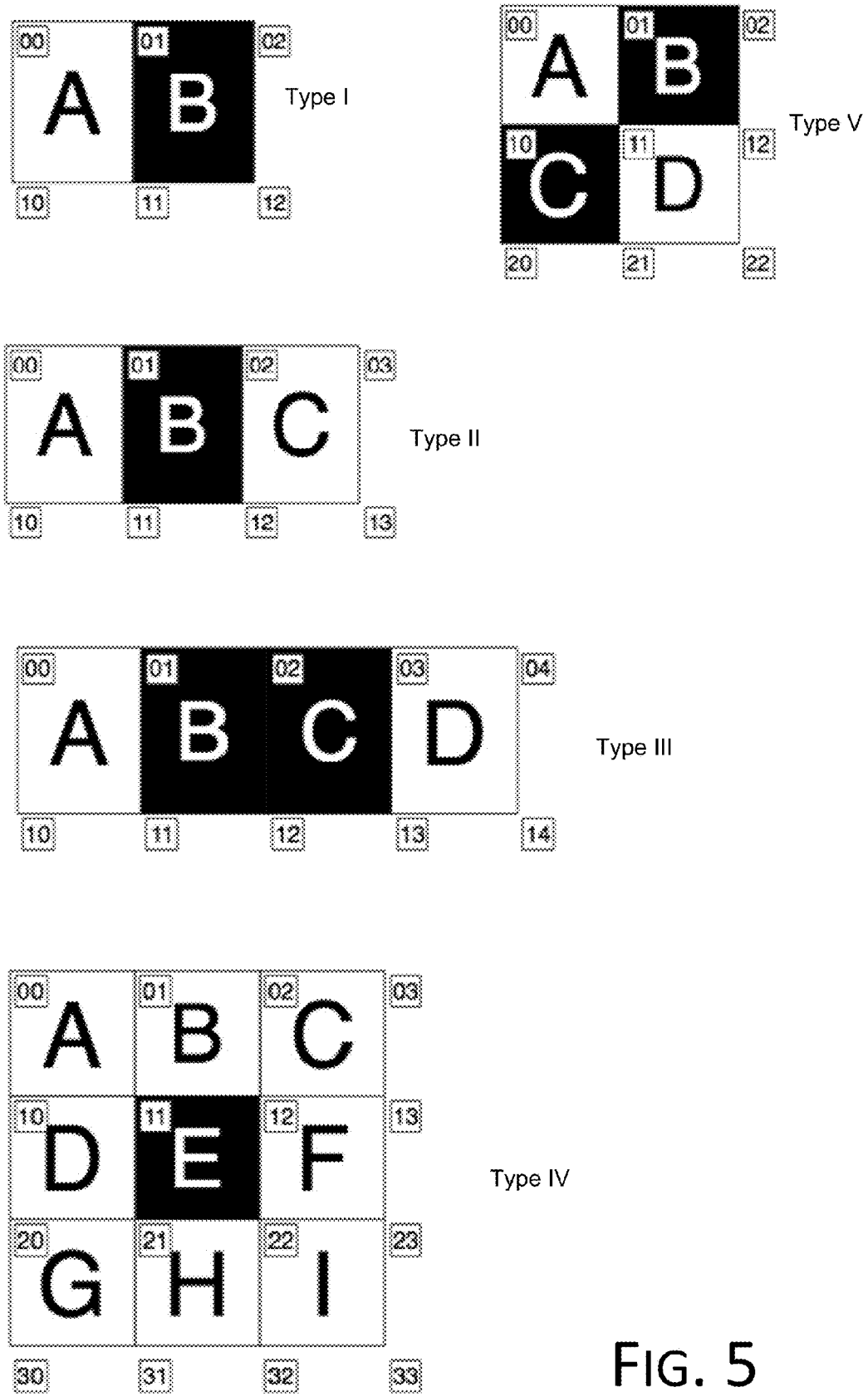
FIG. 5 schematically illustrates examples of Haar features that are used with an exhaustive search array of the search node of FIG. 3.

Referring to FIG. 4B, given an integral image, the pixel total of any rectangle in an image can be quickly computed by adding and subtracting the integral images (II) of the four pixels at the corners A, B, C and D of the rectangle. However, it can be seen in FIG. 5 that when integral image pixels B and C are subtracted from integral image pixel D, the integral image pixel A is subtracted off twice. Thus, the area is given by: Rect(A, B, C, D)·area=II (D)−II(C)−II(B)+II(A).

Figure 6:
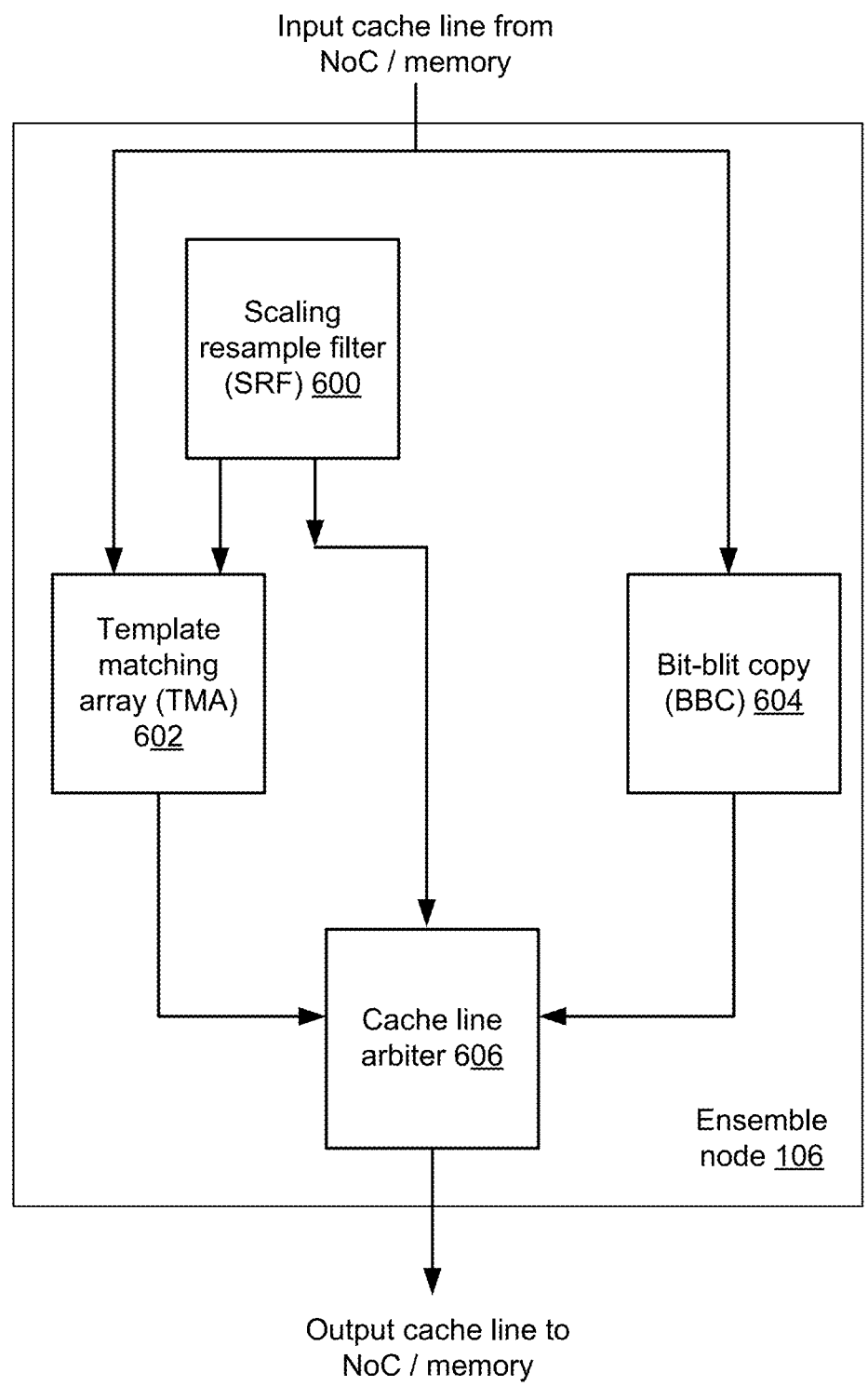
FIG. 6 schematically illustrates an ensemble node of the ASIC of FIG. 1, in accordance with various embodiments.

FIG. 6 schematically illustrates the ensemble node 106. The ensemble node 106 augments the search node 104. The initial search from the search node 104 can be equated to finding a Region of Interest (ROI). The ensemble node 106 accelerates post-search tasks such as stereo association and primary face selection or temporal association.

Even when the search node 104 initially appears to produce a strong detection by finding a face in both the left and right stereo images, such a finding still needs to be confirmed. It is confirmed by comparing that the position and size of a face found in one image has a corresponding face of the appropriate size and position in the other stereo image of the pair of images. If there are multiple faces in the frame the ensemble node creates a depth map of any faces found in the images and selects the face closest to the cameras as the face to track. Furthermore, histories of previously found face templates are retained in order to distinguish a primary user from other faces found in the image. Once the primary face has been found, the ensemble node 106 sends the face back to the search node 104 to extract the features from the face. The ensemble node then sends the features and X, Y, Z coordinates of the location of the face to the application processor (not illustrated).

The ensemble node 106 is primarily designed to compare a face found in one image to an area of interest in another spatially or temporally related image. The ensemble node 106 includes a mechanism for comparing a small area of one image to a somewhat larger area of another image. The small image is generally referred to as a template, and the act of comparison is referred to as template matching.

The ensemble node 106 includes a SRF 600 that is identical to the SRF 302 of the search node 104. The ensemble node 106 further includes a template matching array (TMA) 602, a Bit-Blit Copy (BBC) 604 and a cache line arbiter 606.

The SRF 600 can be used independently or it can be configured to feed scaled images directly into the TMA 602. Once matches are found by the TMA 602, the ensemble node 106 needs to organize the information by moving templates or pieces of images around. These pieces of images are referred to as "bit-blits." The bit-blits are moved around by the BBC 604. The BBC 604 is dedicated hardware support for copying sub-frame windows of pixels from one location to another. A common example is the retention of the most recent 10 matching face templates used by the TMA 602.

Figure 7:
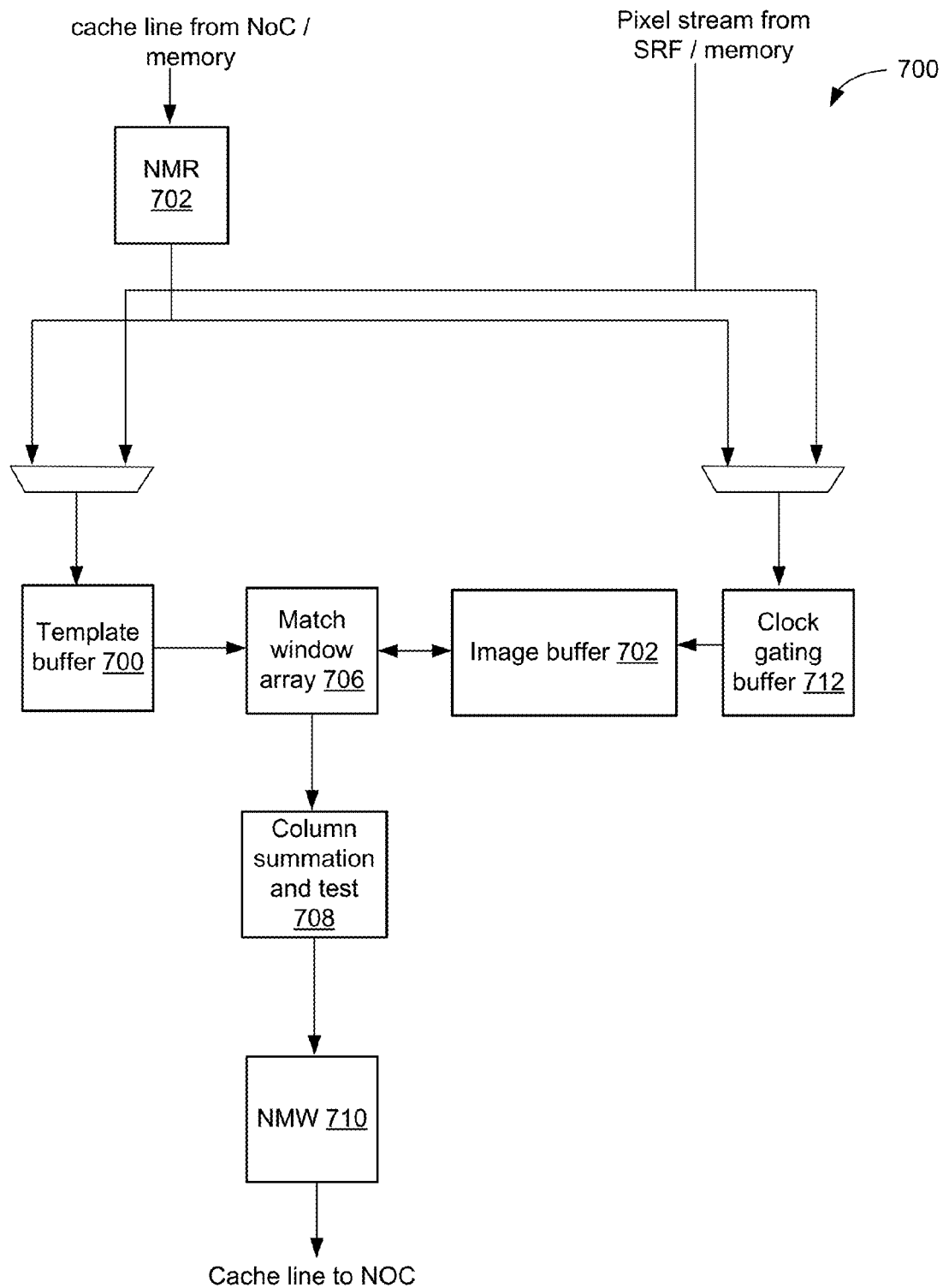
FIG. 7 schematically illustrates a template matching array of the ensemble node of FIG. 6, in accordance with various embodiments.

FIG. 7 schematically illustrates the TMA 602. As can be seen, the TMA 602 largely comprised of a 2D register array/line buffer structure similar to the ISPs 200, 202 and the ESA 300. In the TMA 602, a parallel buffer 700 is used to store a current template. The template buffer receives a template from a NoC memory read (NMR) block 702. The template is a 32×32 template of pixel values for comparison with the ROIs in the images from the search node 104 and can either be a previous template stored in memory or can be based upon one of the two images where an object was found in the ROIs by the search node 104.

The template buffer 700 and an image buffer 704 both feed the 2D match window array 706 where partial comparison data is generated. The comparison data is partial because it is only summed over each row in the 2D window. A column of row results are output from the 2D window once every pixel cycle after the template has been completely circulated the first time.

Each partial result column is passed to a column summation and test block 708 where the column is processed into a pixel location's complete template comparison result value. The comparison result value is passed to a NoC memory write (NMW) block 710 for assembly into cache lines and output to the NoC, i.e. memory 112b or 112c. Each of the comparison result values is tested to find a minimum or maximum value across the image. There are multiple types of matching methods that can be specified. Some of the methods indicate a best match as the minimum pixel result and other methods indicate a best match by a maximum result pixel value.

The TMA 802 will only start generating comparison pixel output once a full template is loaded into the template buffer 700. However, the TMA 802 can proceed to load the image buffer 702 until the full template is loaded. The image pixels can be loaded from the SRF 800 or from memory 112b. A clock gating buffer 712 controls the loading of the image pixels into the image buffer 702.

Table 1 below provides examples of comparison methods that can be used by the match window array 706.

TABLE 1

| Method | Best Match | Description |
| --- | --- | --- |
| SQDIFF | Min | Simple square of the differences |
| SQDIFF_NORM | Min | Simple square of the differences w/normalization |
| CCORR | Max | Cross correlation |
| CCORR_NORM | Max | Cross correlation w/normalization |

In accordance with various embodiments, the comparison result values produced by the comparison methods are normalized by dividing the comparison result by the square root of the product of the sum of template pixels squared and the sum of the image pixels that are covered by the template squared. More particularly, the normalization of any of the pixel results can be computed by multiplying it by the normalization value:

$$N = {}^{-1}\sqrt{\sum_{x',y'} T(x',y')^2 \cdot \sum_{x',y'} I(x+x', y+y')^2}$$

where T represents the template, I represents the current image, x' represents the pixel values of the range of the x positions of the 32×32 template and y' represents the pixel values of the range of the y positions of the 32×32 template.

If the comparison result values were not multiplied by the normalization factor N, then the match window array 706 would need to scale the current image multiple times to account for different contrasts. Thus, the match window array 706 includes adders and multipliers (not illustrated) to compute the sum of template pixels ($\Sigma_{x',y'}T(x',y')^2$), and the sum of the image pixels ($\Sigma_{x',y'}I(x+x', y+y')^2$). The match window array 706 also includes adders and multipliers (not illustrated) to compute an inverse square root. In accordance with various embodiments, the inverse square root is calculated using a Taylor Series Expansion.

Each of the 2D match array taps in the match window array 706 is a standalone computational engine capable of calculating a partial comparison result. The physical microarchitecture is sensitive to the large number of such computational elements.

In accordance with various embodiments, the match window array 706 performs the comparison using a multi-pass strategy, which utilizes less power. A full 32×32 match is still supported, but the match window array 706 actually implements the comparison as two passes through a 32×16 array. Each computational engine is now shared by 4-pixel comparison, so the physical array is actually an array 8-engines wide and 16-engines tall where each engine handles a 1-row of 4-pixels. Thus, four cycles are utilized to compare the entire 32 pixel image width during each of the two passes.

Figure 8A:
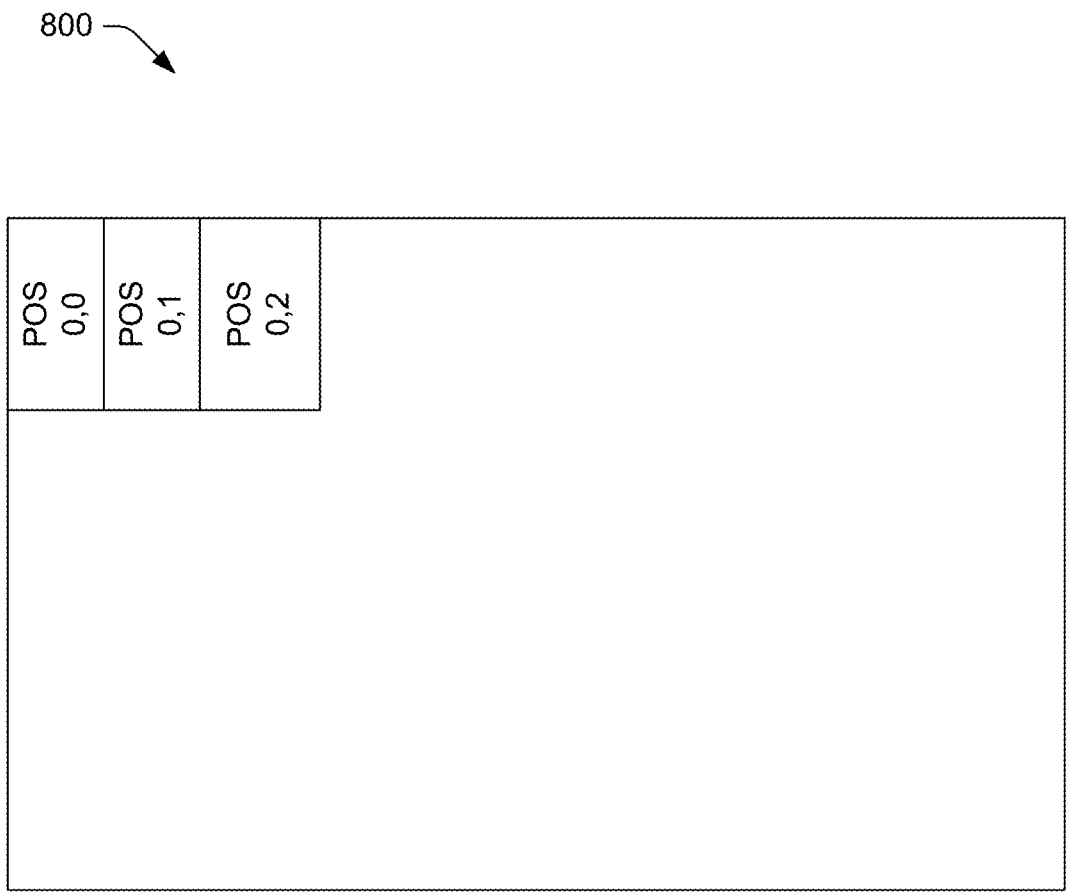
FIG. 8A schematically illustrates a template within an image, in accordance with various embodiments.

For example, referring to FIG. 8A, for searching a template of 32 by 32 pixels within an image 800 of 400 pixels by 400 pixels, position 0,0 is a 32 by 32 comparison done at the first position of the image. Then the search window is moved by 1 pixel to the right and the same 32 by 32 comparison is performed at position 0,1, and so on. The goal is to find the position that matches the 32 by 32 template the most.

Figure 8B:
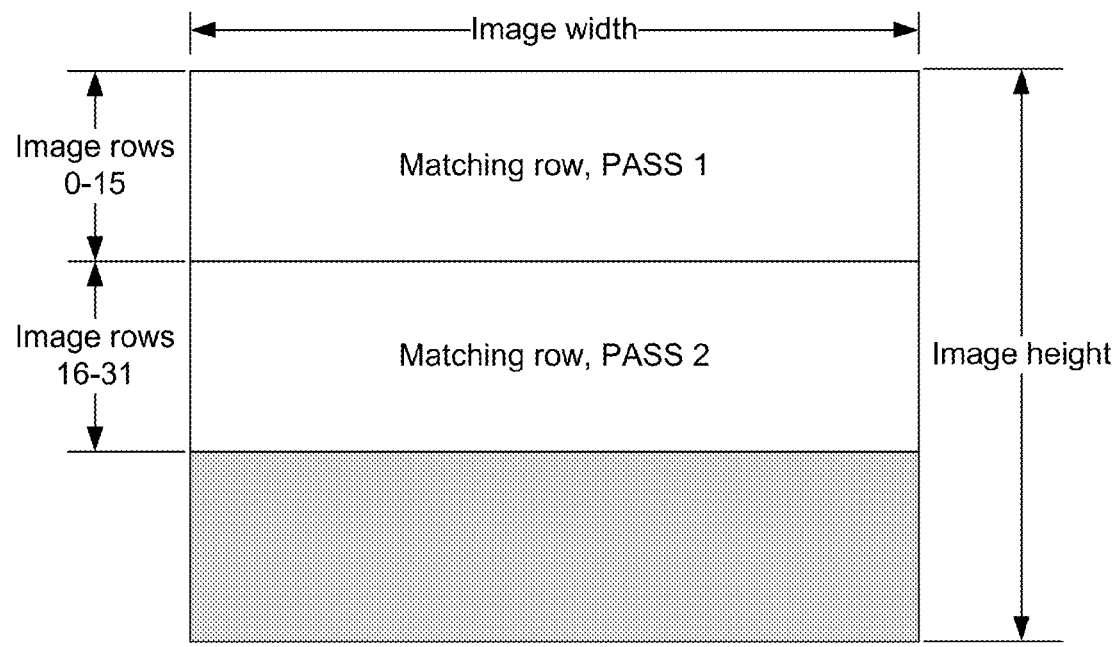
FIGS. 8B and 8C schematically illustrate line buffers of the template matching array of FIG. 7, in accordance with various embodiments.
Figure 8C:
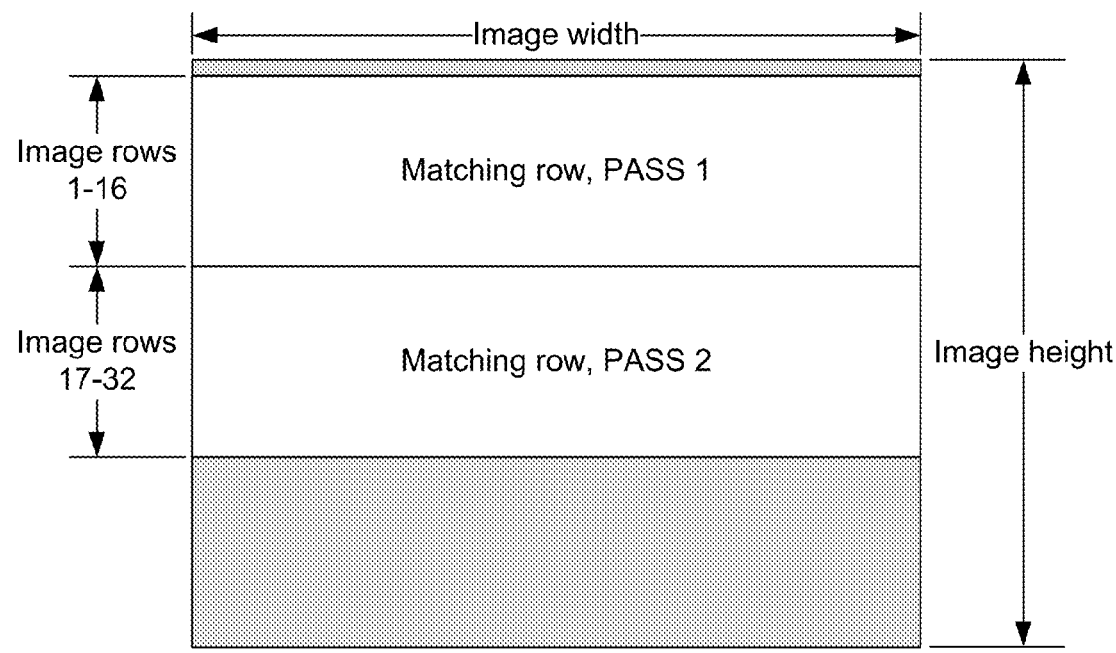

Referring to FIG. 8B, it can be seen that the line buffers still contain a full template height of 32 image rows, but they are read out only 16 rows at a time. The partial results of the image comparison and the image summation are both saved from pass 1 and compressed into pass 2. Once matching row 0 has been fully compared, the top image row can be discarded from the line buffers and matching row 1 can then begin processing, as illustrated in FIG. 8C. In the present example, the 32 by 32 computation is performed using the array of 8-engines wide (horizontal) and 16-engines tall (vertical), where each engine handles a 1-row of 4-pixels datapath unit. Thus, each row now requires four times more processing time (cycles) and 2 passes need to be performed. However, the 8 by 16 datapath is generally a more realistic approach than a 32 by 32 datapath from a power perspective. The 8 by 16 datapath still offers significant acceleration as compared to a central processing unit. This arrangement also has an advantage of reducing peak power while also providing a good amount of acceleration. An example of peak power may be approximately 80-90 milliwatts for the 8 by 16 datapath compared to 1.0 to 1.5 watts for a 32 by 32 datapath. An added benefit is that this multi-pass approach can be extended to support other arbitrary template sizes larger (or smaller) than 32 by 32 as well.

Figure 9A:
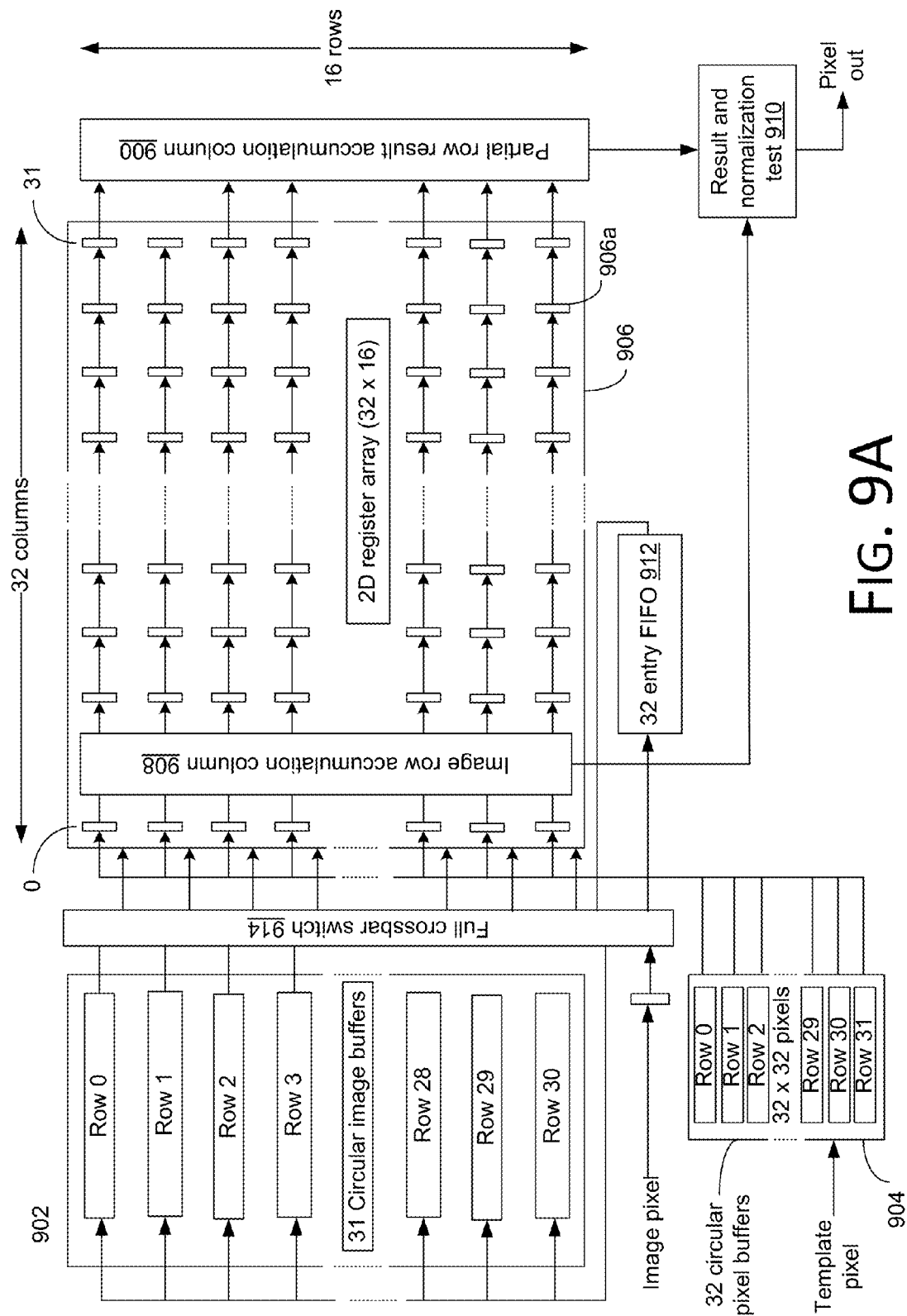
FIG. 9A schematically illustrates a match window array of the template matching array of FIG. 7, in accordance with various embodiments.

Referring to FIG. 9A, which schematically illustrates the match window array 706, the partial comparison results for each pixel result from pass 1 in FIGS. 8B and 8C are saved into a dedicated line buffer 900. If normalization is active, then the partial image summation results for each pixel are also saved into an additional dedicated line buffer (not illustrated). These saved partial results are then read by the second pass and compressed into its partial results before being written back into the dedicated line buffer(s). The results of the $2^{nd}$ pass are final results and can proceed to the normalization and final result computation.

As previously noted, the match window array 906 is an array of small computational engines that include accumulators, i.e. registers that store intermediate results, as well as logic necessary to feed the computational engines operands to work on. The operands are a 2D image and a smaller 2D template, and each are stored in arrays of circular row buffers 902, 904. The circular row buffers 902, 904 work very similarly to the ISPs 200, 202 and ESA 300. Specifically, the image buffers 902 provide access to the complete subset of 32×32 sub-images present in the original image starting at the top left hand corner of the original image and proceeding in raster order through to the bottom right hand corner of the original image. Every pixel cycle the left column of the array is dropped and a new right column is added, so the 32×32 sub-image (or more accurately the 32×16 sub-image) is only valid in the array for a single pixel cycle.

The template is assumed to be loaded into the circular row buffers 904 before the image is loaded into the circular row buffers 902, so the template's top 16 rows of pixels can be preloaded into a computational array 906 made up of the computational engines 906a. The 16 rows of pixels are shifted in from array column 0 (on the left) toward array column 31 (on the right). Once in place, the template pixels are static for the entire 32×16 comparison. The image enters the computational array 906 much differently. The image is presented to the computational array 906 one column of image data at a time, and the column of image data is provided to every column in the computational array 906 simultaneously.

On the first cycle that the computational array 906 is completely filled with template pixels, the first column of the image (i.e. column 0) is compared across all of the columns of the computational array 906. The first column of the image is only compared to the first column of the template and when the image column gets equal to or larger than the template width, the image pixel will be used in all 32-partial comparison results in parallel.

Each image column is sequenced through and presented to the computational array 906. Note that the number of comparisons an individual image pixel is used in tapers down as the right edge of the image is approached. In fact the right most image pixel is just like the left in that it is also only used in a single template comparison. This is the reason the template is shifted into the computational array 906 from left to right rather than the more familiar raster order. The next 16 template pixel rows can enter the array directly behind the last value accumulator for the current 16 rows as the last value accumulator shifts out. However, there is some flexibility because as long as template column 0 is valid, the next 16 rows can start the first accumulation directly behind the current 16 rows.

Figure 9B:
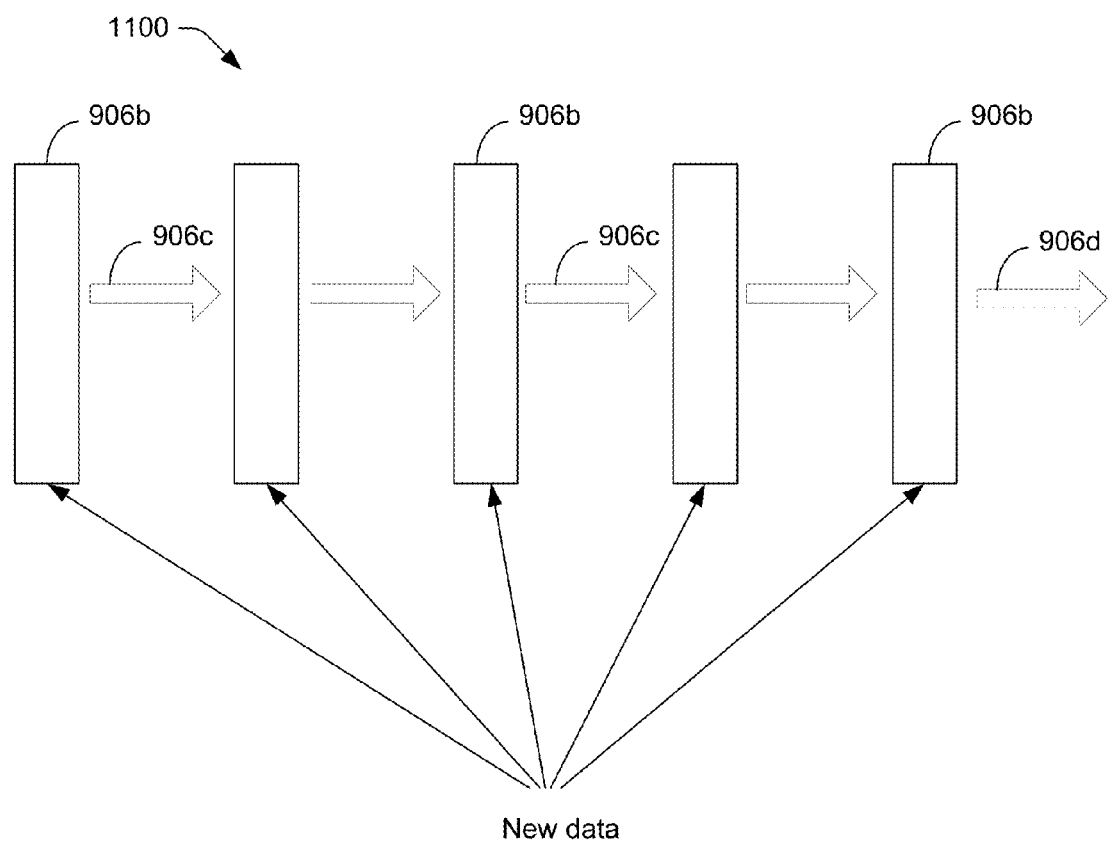
FIG. 9B schematically illustrates computational columns and accumulators of the match window array of FIG. 9A, in accordance with various embodiments.

Referring to FIG. 9B, as previously noted, the column of new image data is broadcast to the columns of computational engines 906a of the computational array 906 at the same time. Here, each column 906b of computational engines 906a (not illustrated in FIG. 9B) of the computational array 906 computes a "partial" sum of squared differences and stores this partial sum of squared differences in accumulators 906c. The accumulators 906b are provided in the columns of the computational array 906. The partial differences move through the computational array 906 as shown in FIG. 9B. In each cycle, a given column advances the running sum of squared differences for a given position, adds it to the accumulated value and then forwards this sum to the next accumulator 906b to be stored. In the next cycle, the same column of the computational array 906 advances the running sum of squared differences of the next position. In this fashion, the running sum is "passed along" the array from left to right. Since accumulator registers generally switch each cycle anyways, moving along the array does not consume any extra power consumption. FIG. 9C is a table illustrating the data pipeline. Note each cycle actually represents four cycles due to the use of the array of 8 by 16 computational engines 906a. Thus, new image data is broadcast to the columns of computational engines 906a of the computational array 906 at the same time every four cycles. Accumulator 906d passes out a final running sum of squared differences.

The rows of the computational array 906 generally do not interact except in two places—the partial row result accumulation column 900 and an image row accumulation column 908. The partial row result accumulation column 900 and the image row accumulation column 908 are both specially designed columns that are used to aggregate the accumulated row results and combine them into a single result.

The rows of the computational array 906 operate independent of each other for the most part until a sub-image row result is complete. When ready, the column where the sub-image row exists is selected to enter the partial row image accumulation column 900. The partial row image accumulation column 900's primary function is to sum all of the row accumulate results into a final accumulated result and deliver it to a result normalization and formatting block 910.

The top three partial row results are accumulated into redundant binary, i.e. carry/save, by a full adder vector. This initial 3:2 is followed by another 3:2 for each additional row that is accumulated for a total of 14-each 3:2 stages. The final 3:2 (in row 15) is followed by a full carry propagation adder (CPA), which is used to compute the final column result.

The image accumulation column 908 is generally more complicated than the partial row result accumulation column 900 because it also accumulates each row result first. A computational engine is necessary to compute the image accumulation for each row. This computational engine will serve to calculate the sum-of-squares (SoS) for the template, the first 48×48 sub-image in the image row, and then each subsequent 32×32 sub-image in the row. In order to share hardware between the template SoS and the many sub-image SoSs, the template is loaded first into the template buffers 904 and the template's SoS can be calculated while the image is still being read into the image buffers 902. The TMA 802 will need to sequence all of the template columns through the match window array 906 once before matching starts in order to compute the template SoS. Note that an accumulator (not illustrated) can be used to retain the accumulated results from the rows 0-15. Template rows 16-31 will simply accumulate with row 0-15 before the individual row accumulators are summed down the column.

The first sub-image in any given image row is calculated much differently than each subsequent sub-image. The first in the row is calculated directly. Specifically, each image pixel is read in, squared, and accumulated with all of the previous pixels in the row. Normally, it would be necessary to retain 31 other partial results in parallel with this first accumulation, but since it is a running total, once the first 32 pixel row result is ready, the next result can be calculated by accumulating in the next squared pixel value (as normal), but also by subtracting the squared pixel value that is being removed from the left edge of the match window array 906 being fed from the right edge of the match window array 906 by the image buffer 902.

A 32-entry FIFO 912 is provided for the image pixel input row 31 since image pixel input row 31 does not require a line buffer. A second read from the line buffers is an option for the other 31 rows because the other 31 rows are only read every 4 cycles. A full crossbar switch 914 is provided for controlling loading from the circular image buffers 902 into the computational array 906.

The result provided by the match window array 906 requires normalization if a normalized comparison method is selected for use. The normalization requires the SoS for both the template and each individual 32×32 sub-image. The template SoS is computed (as the image is still being read in from memory) and saved for the remainder of the frame in a holding register. Once the first image accumulation column result arrives, it is multiplied by the saved SoS resulting in a 52-bit fixed-point result (assuming 32×32). The result has been computed to full accuracy (no rounding or truncation) and then converted to "statistically unbiased round to nearest" in accordance with IEEE 754.

Once the result has been computed and the presence of an object, i.e. a user's face, has been confirmed, the image can be sent to the search node 104 to extract facial features from the image. The final result is a position of the object, i.e. the user's face, given by X, Y and Z coordinates. The position of the user's face is relative to the center between the user's eyes. The coordinates are provided to an application processor, central processing unit, etc. of a portable electronic device that includes the ASIC 100.

Figure 10:
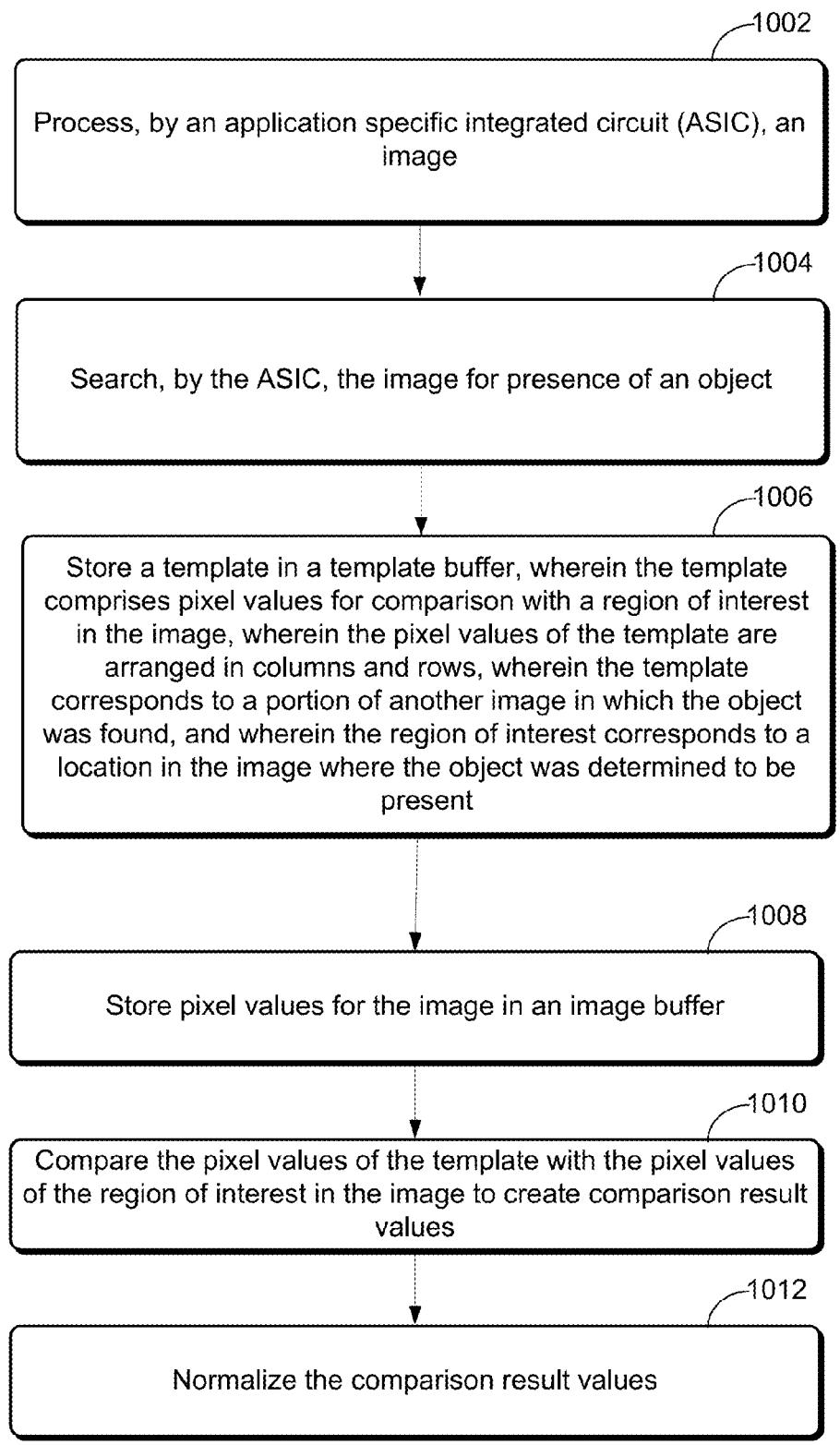
FIG. 10 is a flowchart illustrating an example of a process of comparing pixel values of a template with pixel values of an image to search for an object in the image and normalizing the comparison results using the ASIC of FIG. 1, in accordance with various embodiments.

FIG. 10 is a flowchart illustrating an example of a process 1000 of a method of comparing pixel values of a template with pixel values of an image to search for an object in the image and normalizing the comparison results using an ASIC, for example the ASIC 100, in accordance with various embodiments. At 1002, an Application Specific Integrated Circuit (ASIC) processes an image to improve quality of the image. At 1004, the ASIC searches the image for presence of an object. Upon determining the presence of an object in the image, the ASIC confirms the presence of the object. Thus, at 1006, a template is stored in a template buffer. The template comprises pixel values for comparison with a region of interest in the image and the pixel values of the template are arranged in columns and rows. The template generally corresponds to a portion of another image in which the object was found and the region of interest corresponds to a location in the image where the object was determined to be present. At 1008, pixel values for the image are stored in an image buffer. At 1010, the pixel values of the template are compared with the pixel values of the region of interest in the image to create comparison result values. At 1012, the comparison result values are normalized.

Figure 11:
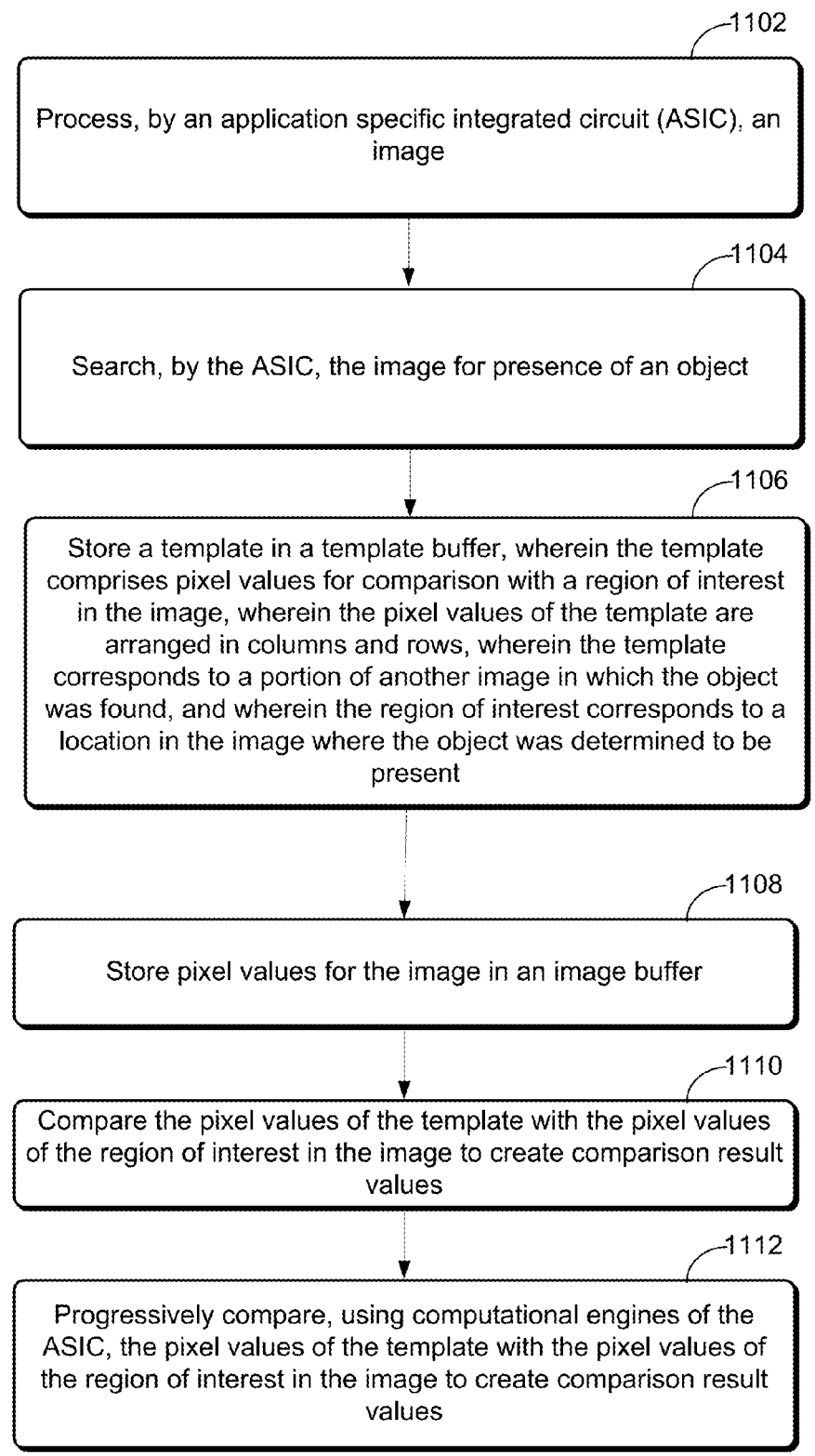
FIG. 11 is a flowchart illustrating an example of a process of progressively comparing, using accumulators, pixel values of a template with pixel values of an image to search for an object in the image using the ASIC of FIG. 1, in accordance with various embodiments.

FIG. 11 is a flowchart illustrating an example of a process 1100 of a method of progressively comparing, using computational engines, pixel values of a template with pixel values of an image to search for an object in the image using an ASIC, for example the ASIC 100, in accordance with various embodiments. At 1102, an Application Specific Integrated Circuit (ASIC) processes an image to improve quality of the image. At 1104, the ASIC searches the image for presence of an object. Upon determining the presence of an object in the image, the ASIC confirms the presence of the object. Thus, at 1106, a template is stored in a template buffer. The template comprises pixel values for comparison with a region of interest in the image and the pixel values of the template are arranged in columns and rows. The template generally corresponds to a portion of another image in which the object was found and the region of interest corresponds to a location in the image where the object was determined to be present. At 1108, pixel values for the image are stored in an image buffer. At 1110, the pixel values of the template are compared with the pixel values of the region of interest in the image to create comparison result values. At 1112, the computational engines of the ASIC progressively compare the pixel values of the template with the pixel values of the region of interest in the image to create comparison result values.

Figure 12:
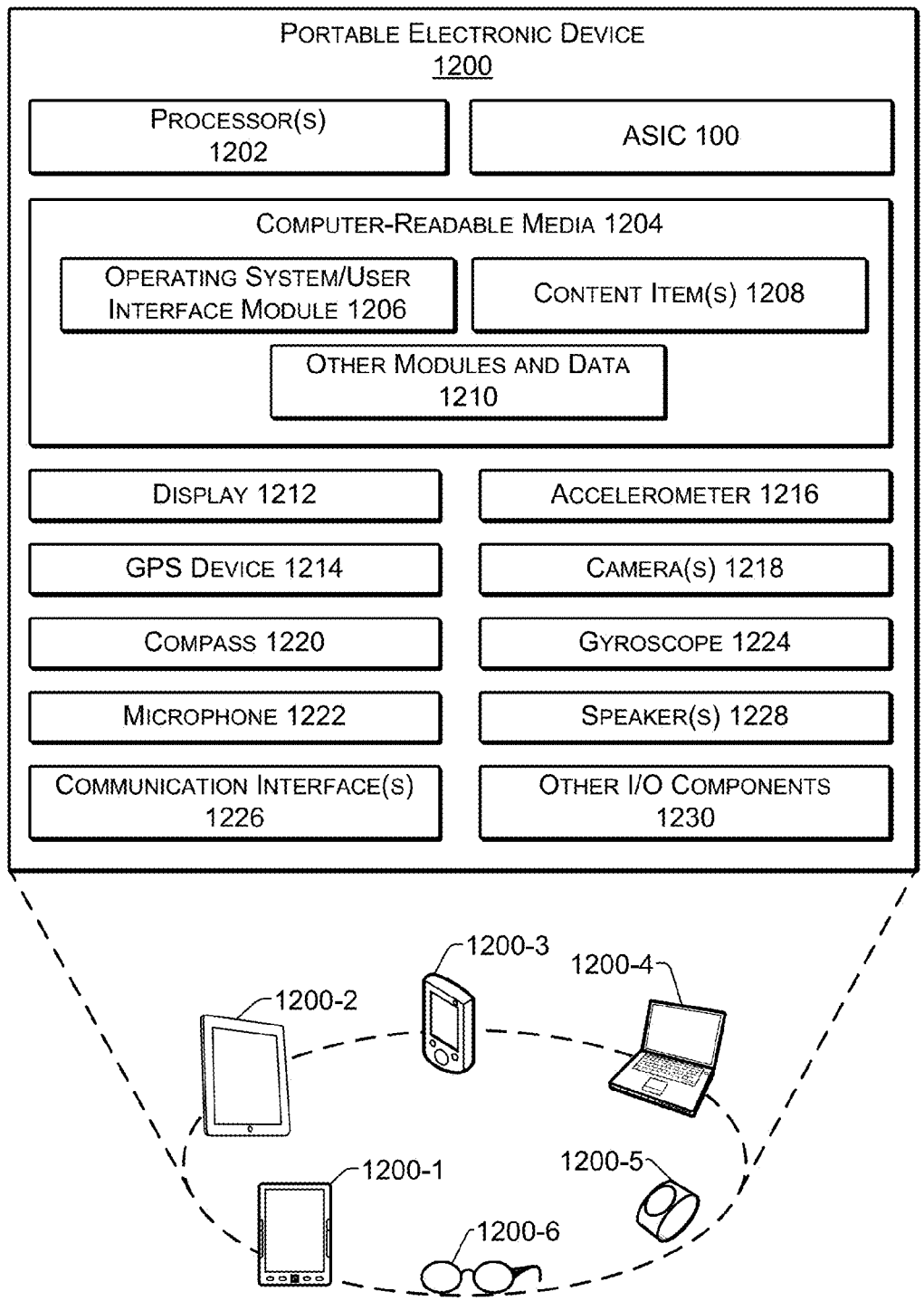
FIG. 12 illustrates select components of an example portable electronic device that includes the ASIC of FIG. 1, in accordance with various embodiments.

FIG. 12 illustrates select example components of an example portable electronic device 1200 that includes an ASIC 100 as described herein. The portable electronic device 1200 may be implemented as any of a number of different types of electronic devices. Some examples of the portable electronic device 1200 may include digital media devices and eBook readers 1200-1; tablet computing devices 1200-2; smartphones, mobile devices and portable gaming systems 1200-3; laptop and netbook computing devices 1200-4; wearable computing devices 1200-5; augmented reality devices, helmets, goggles or glasses 1200-6; etc. This list is only an example and is not meant to be limiting.

In a very basic configuration, the portable electronic device 1200 includes, or accesses, components such as at least one control logic circuit, central processing unit, application processor, or processor 1202, and one or more computer-readable media 1204. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable instructions stored in the computer-readable media 1204 or other computer-readable media.

Depending on the configuration of the portable electronic device 1200, the computer-readable media 1204 may be an example of tangible non-transitory computer storage media and may include volatile and nonvolatile memory and/or removable and non-removable media implemented in any type of technology for storage of information such as computer-readable instructions, data structures, program modules or other data. The computer-readable media 1204 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable electronic device 1200 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202.

The computer-readable media 1204 may be used to store and maintain any number of functional components that are executable by the processor 1202. In some implementations, these functional components comprise instructions or programs that are executable by the processor 1202 and that, when executed, implement operational logic for performing some actions described herein. Functional components of the portable electronic device 1200 stored in the computer-readable media 1204 may include an operating system/user interface module 1206 for controlling and managing various functions of the portable electronic device 1200.

In addition, the computer-readable media 1204 may also store data, data structures and the like, that are used by the functional components. For example, data stored by the computer-readable media 1204 may include user information and, optionally, one or more content items 1208. Depending on the type of the portable electronic device 1200, the computer-readable media 1204 may also optionally include other functional components and data, such as other modules and data 1210, which may include programs, drivers and so forth, and the data used by the functional components. Further, the portable electronic device 1200 may include many other logical, programmatic and physical components, of which those described are merely examples that are related to the discussion herein. Further, while the figures illustrate the functional components and data of the portable electronic device 1200 as being present on the portable electronic device 1200 and executed by the processor 1202 on the portable electronic device 1200, it is to be appreciated that these components and/or data may be distributed across different computing devices and locations in any manner.

FIG. 12 further illustrates other components of the example of the portable electronic device 1200. Such examples include a display 1212 and various types of sensors, which may include a GPS device 1214, an accelerometer 1216, one or more cameras 1218, a compass 1220, a microphone 1222, a gyroscope 1224, and so forth. In accordance with various embodiments, the portable electronic device includes at least four corner cameras located at corners and/or edges of the display 1212.

The portable electronic device 1200 may further include one or more communication interfaces 1226, which may support both wired and wireless connection to various networks, such as cellular networks, radio, Wi-Fi networks, close-range wireless connections, near-field connections, infrared signals, local area networks, wide area networks, the Internet, and so forth. The communication interfaces 1226 may further allow a user to access storage on or through another device, such as a remote computing device, a network attached storage device, cloud storage, or the like.

The portable electronic device 1200 may further be equipped with one or more speakers 1228 and various other input/output (I/O) components 1230. Such I/O components 1230 may include a touchscreen and various user controls (e.g., buttons, a joystick, a keyboard, a keypad, etc.), a haptic or tactile output device, connection ports, physical condition sensors, and so forth. For example, the operating system 1206 of the portable electronic device 1200 may include suitable drivers configured to accept input from a keypad, keyboard, or other user controls and devices included as the I/O components 1230. The display 1212 may be configured as a touchscreen or the portable electronic device 1200 may include a separate touchscreen. The processor 1202 can perform one or more functions attributed to a graphic controller (not illustrated) for the display 1212. Functional components of the portable electronic device 1200 stored in the computer-readable media 1204 may include the user interface module 1206 for controlling and managing various functions of the portable electronic device 1200, and for generating one or more user interfaces on the display 1212 of the portable electronic device 1200. Additionally, the portable electronic device 1200 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these program modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An Application Specific Integrated Circuit (ASIC) comprising:
   an image node configured to process a first image and a second image by (i) detecting and correcting defective pixels of the first and the second images, (ii) correcting black-levels within the first and the second images, and (iii) providing gain control;
   a search node configured to search the first image and the second image to determine presence of a human face in the first and the second images based upon integral images of the first and second images, wherein an integral image comprises integral image pixel values, where an integral image pixel value for a pixel comprises the sum of all pixel values above and to the left of a location of the pixel; and
   an ensemble node configured to confirm the presence of the human face in the first and second images by comparing a template comprising pixel values with pixel values of a region of interest in the first and the second images, wherein the region of interest is based upon a determination by the search node of the presence of a human face, wherein the ensemble node comprises:
      a template buffer configured to store the template, wherein the pixel values of the template are arranged in columns and rows, wherein the template corresponds to a portion of a previous image in which the human face was found;
      an image buffer configured to store the first and the second images; and
      a summation and test node comprising a match window array configured to compare each row of pixel values of the template with each corresponding row of pixel values within the region of interest of at least one of the first and the second images to determine a difference between pixel values of the template and pixel values of the region of interest, and wherein the match window array comprises computational engines comprising accumulators to store intermediate results, wherein the computational engines are configured to (i) progressively sum differences from comparison of each row of pixel values of the template with each corresponding row of pixel values of the region of interest into comparison result values, wherein the progressive summing comprises comparing each row of pixel values column by column and (ii) analyze the comparison result values using one of a simple square of the differences method or a cross correlation method to determine a location of the human face in the first and second images based upon the comparison result values, wherein location of the human face is based upon minimum comparison result values using the simple square of the differences method, and wherein location of the human face is based upon maximum comparison result values using the cross correlation method.

2. The ASIC of claim 1, wherein the template comprises an array of 32 rows by 32 columns of integral image pixel values and the summation and test node comprises an array of computational engines arranged in an array of 8 rows by 16 columns.

3. The ASIC of claim 1, wherein the match window array is further configured to normalize the comparison result values using an equation $$N = \sqrt{\sum_{x',y'} T(x',y')^2 \cdot \sum_{x',y'} I(x+x', y+y')^2},$$

where T represents the template, I represents one of the first and second images, x' and y' represent the pixel values of the template, and x and y represent the pixel values of one of the first and second images.

4. A method of confirming the presence of an object within an image, the method comprising:
   processing, by an application specific integrated circuit (ASIC), an image;
   searching, by the ASIC, the image for presence of an object;
   upon determining the presence of the object in the image, confirming, by the ASIC, the presence of the object, wherein the confirming comprises:
      storing a template in a template buffer, wherein the template comprises pixel values for comparison with pixel values of a region of interest in the image, wherein the pixel values of the template are arranged in columns and rows, wherein the template corresponds to a portion of another image in which the object was found, and wherein the region of interest corresponds to a location in the image where the object was determined to be present;
      storing pixel values for the image in an image buffer;
      progressively comparing, using computational engines of the ASIC, the pixel values of the template with the pixel values of the region of interest in the image to create comparison result values; and
      normalizing the comparison result values, wherein the normalizing the comparison result values comprises using an equation $$N = \sqrt{\sum_{x',y'} T(x',y')^2 \cdot \sum_{x',y'} I(x+x', y+y')^2},$$

where T represents the template, I represents the image, x' and y' represent the pixel values of the template, and x and y represent the pixel values of the image.

5. The method of claim 4, wherein the comparing comprises:
   determining differences between rows of pixel values of the template and rows of pixel values of the region of interest in the image; and
   progressively summing differences into the comparison result values.

6. The method of claim 5, wherein progressively summing comprises comparing each row of pixel values column by column.

7. The method of claim 5, wherein the progressively summing comprises summing results from the comparison using one of (i) a simple square of the differences method or (ii) a cross correlation method.

8. The method of claim 4, wherein the template comprises 32 rows of pixel values by 32 columns of pixel values and the comparing comprises comparing an array of 16 rows of pixel values of the template with 16 rows of pixel values of the image at a time.

9. The method of claim 4, wherein the template comprises 32 rows of pixel values by 32 columns of pixel values and the comparing comprises comparing an array of 8 columns of image pixel values by 16 rows of pixel values of the image at a time.

10. The method of claim 4, further comprising:
determining X, Y, Z, coordinates of a location of the object in the image; and
determining features of the object and forwarding the features and X, Y, Z coordinates to an application processor.

11. A portable electronic device comprising:
a camera to capture images; and
an application specific integrated circuit (ASIC) configured to locate objects within the images, the ASIC comprising:
a first node configured to process an image;
a second node configured to search for the presence of an object in the image; and
a third node configured to upon determining the presence of the object by the second node, confirm the presence of the object in the image, wherein the third node comprises computational engines that include accumulators, and wherein the third node is configured to:
store a template in a template buffer, wherein the template comprises pixel values for comparison with pixel values of a region of interest in the image, wherein the pixel values of the template are arranged in columns and rows, wherein the template corresponds to a portion of another image in which the object was found, and wherein the region of interest corresponds to a location in the image where the object was determined to be present;
store pixel values for the image in an image buffer;
progressively compare the pixel values of the template with the pixel values of the region of interest in the image to create comparison result values; and
normalize the comparison result values comprises using an equation $$N = \sqrt{\sum_{x',y'} T(x',y')^2 \cdot \sum_{x',y'} I(x+x',y+y')^2},$$

where T represents the template, I represents the image, x' and y' represent the pixel values of the template, and x and y represent the pixel values of the image.

12. The portable electronic device of claim 11, wherein the third node is further configured to:
determine differences between rows of pixel values of the template and rows of pixel values of the region of interest in the image; and
progressively sum differences into the comparison result values.

13. The portable electronic device of claim 12, wherein the third node is further configured to progressively sum by comparing each row of pixel values column by column.

14. The portable electronic device of claim 13, wherein the third node is further configured to sum results from the comparison using one of (i) a simple square of the differences method or (ii) a cross correlation method.

15. The portable electronic device of claim 12, wherein the template comprises 32 rows of pixel values by 32 columns of pixel values and comparing comprises comparing 16 rows of pixel values of the template with 16 rows of pixel values of the image at a time.

16. The portable electronic device of claim 12, wherein the template comprises 32 rows of integral image pixel values by 32 columns of pixel values and comparing comprises comparing an array of 8 columns of image pixel values by 16 rows of pixel values of the image at a time.

17. The portable electronic device of claim 12, wherein the third node is further configured to:
determine X, Y, Z, coordinates of a location of the object in the image; and
determine features of the object and the third node is further configured to forward the features and the X, Y, Z coordinates to an application processor.

18. The portable electronic device of claim 11, wherein the template comprises an array of 32 columns by 32 rows and the summation and test node comprises an array of computational engines arranged in an array of 8 horizontal by 16 vertical computational elements.

* * * * *